(12) United States Patent
Hsieh et al.

(10) Patent No.: US 8,379,982 B2
(45) Date of Patent: *Feb. 19, 2013

(54) SYSTEM AND METHOD FOR FAST BIOMETRIC PATTERN MATCHING

(75) Inventors: Ming Hsieh, So. Pasadena, CA (US); Huansheng Xue, San Gabriel, CA (US); Ping Chen, So. Pasadena, CA (US); Jing Wang, Arcadia, CA (US)

(73) Assignee: 3M Cogent, Inc., Pasadena, CA (US)

( * ) Notice: Subject to any disclaimer, the term of this patent is extended or adjusted under 35 U.S.C. 154(b) by 329 days.

This patent is subject to a terminal disclaimer.

(21) Appl. No.: 12/578,469

(22) Filed: Oct. 13, 2009

(65) Prior Publication Data

US 2010/0027852 A1    Feb. 4, 2010

Related U.S. Application Data (63) Continuation of application No. 11/271,411, filed on Nov. 9, 2005, now Pat. No. 7,616,788.

(60) Provisional application No. 60/627,275, filed on Nov. 12, 2004.

(51) Int. Cl.
*G06K 9/00* (2006.01)

(52) U.S. Cl. ........................................................ 382/181

(58) Field of Classification Search ........................ None
See application file for complete search history.

(56) References Cited

U.S. PATENT DOCUMENTS

| | | |
|---|---|---|
| 4,569,080 A | 2/1986 | Schiller |
| 4,784,484 A | 11/1988 | Jensen |
| 4,832,485 A | 5/1989 | Bowles |
| 4,833,724 A | 5/1989 | Goel |
| 4,924,085 A | 5/1990 | Kato |
| 5,233,404 A | 8/1993 | Lougheed |
| 5,245,672 A | 9/1993 | Wilson et al. |
| 5,416,573 A | 5/1995 | Sartor, Jr. |
| 5,448,649 A | 9/1995 | Chen |
| 5,517,419 A | 5/1996 | Lanckton |
| 5,528,355 A | 6/1996 | Maase et al. |
| 5,596,454 A | 1/1997 | Hebert |
| 5,613,014 A | 3/1997 | Eshera et al. |
| 5,621,516 A | 4/1997 | Shinzaki |
| 5,633,947 A | 5/1997 | Sibbald |
| 5,751,836 A | 5/1998 | Wildes et al. |
| 5,799,098 A * | 8/1998 | Ort et al. .................... 382/125 |

(Continued)

FOREIGN PATENT DOCUMENTS

| | | |
|---|---|---|
| EP | 0 098 607 | 7/1983 |
| WO | WO 96/13742 | 10/1995 |

(Continued)

OTHER PUBLICATIONS

U.S. Appl. No. 60/357,557, entitled "Automatic Dredge System and Method of Operation," filed Feb. 15, 2002.

(Continued)

*Primary Examiner* — Chan S Park
*Assistant Examiner* — Elisa Rice (57) ABSTRACT

A method and system for matching two biometric images including receiving an input biometric image; generating an index table for the input biometric image, wherein the index table includes a quality quantity for each minutia of the input biometric image; receiving a second biometric image; generating a number of patterns for a first minutia of the second biometric image; associatively accessing the index table by the generated number of patterns; accumulating quality quantities accessed from the index table for each minutia of the input biometric image for the number of patterns of the first minutia of the second biometric image; and selecting a minutia candidate of the input biometric image responsive to the accumulated quality quantities.

20 Claims, 10 Drawing Sheets

U.S. PATENT DOCUMENTS

| | | | |
|---|---|---|---|
| 5,828,769 | A | 10/1998 | Burns |
| 5,828,773 | A | 10/1998 | Setlak |
| 5,900,993 | A | 5/1999 | Betensky |
| 5,942,761 | A | 8/1999 | Tuli |
| 6,002,815 | A | 12/1999 | Immega et al. |
| 6,011,860 | A | 1/2000 | Fujieda |
| 6,175,407 | B1 | 1/2001 | Sartor |
| 6,249,360 | B1 | 6/2001 | Pollard et al. |
| 6,259,108 | B1 | 7/2001 | Antonelli et al. |
| 6,324,020 | B1 | 11/2001 | Teng et al. |
| 6,355,937 | B2 | 3/2002 | Antonelli et al. |
| 6,483,932 | B1 | 11/2002 | Martinez et al. |
| 6,505,905 | B1 | 1/2003 | Krouss |
| 6,870,538 | B2 | 3/2005 | Macinnis |
| 6,879,709 | B2 | 4/2005 | Tian et al. |
| 6,912,638 | B2 | 6/2005 | Hellman |
| 6,928,195 | B2 | 8/2005 | Scott et al. |
| 6,934,409 | B2 | 8/2005 | Ohara |
| 6,956,608 | B1 | 10/2005 | Shapiro |
| 6,980,286 | B1 | 12/2005 | Feng |
| 6,993,165 | B2 | 1/2006 | McClurg et al. |
| 7,081,951 | B2 | 7/2006 | Carver et al. |
| 7,095,880 | B2 | 8/2006 | Martinez et al. |
| 7,194,393 | B2 | 3/2007 | Wei et al. |
| 7,203,344 | B2 | 4/2007 | McClurg et al. |
| 7,267,799 | B1 | 9/2007 | Borich et al. |
| 7,277,562 | B2 | 10/2007 | Zyzdryn |
| 7,315,632 | B2 | 1/2008 | Spycher |
| 7,418,123 | B2 | 8/2008 | Giger |
| 7,564,495 | B2 | 7/2009 | Lee |
| 7,580,567 | B2 | 8/2009 | Hsieh et al. |
| 7,587,064 | B2 | 9/2009 | Owechko et al. |
| 7,616,788 | B2 | 11/2009 | Hsieh et al. |
| 7,639,858 | B2 | 12/2009 | Ross et al. |
| 7,796,266 | B2 | 9/2010 | Cohen et al. |
| 7,840,062 | B2 | 11/2010 | Boroczky et al. |
| 7,876,934 | B2 | 1/2011 | Georgescu et al. |
| 7,912,528 | B2 | 3/2011 | Krishnan |
| 8,131,477 | B2 | 3/2012 | Li |
| 2003/0013951 | A1 | 1/2003 | Stefanescu et al. |
| 2004/0102931 | A1 | 5/2004 | Ellis |
| 2004/0114829 | A1 | 6/2004 | LeFeuvre et al. |
| 2004/0172238 | A1 | 9/2004 | Choo |
| 2009/0148010 | A1 | 6/2009 | Boroczky |
| 2010/0027852 | A1 | 2/2010 | Hsieh et al. |

FOREIGN PATENT DOCUMENTS

| | | |
|---|---|---|
| WO | WO 01/18741 | 3/2001 |
| WO | WO 2008/024778 | 2/2008 |

OTHER PUBLICATIONS

U.S. Appl. No. 60/915,363, entitled "Apparatus for Capturing a High Quality Image of a Moisten Finger," filed May 1, 2007.

Seul, Michael et al., "Practical Algorithms for Image Analysis," Cambridge University Press 2000, pp. 1-13.

Vincent, Luc, "Morphological Grayscale Reconstruction in Image Analysis: Applications and Efficient Algorithms," Transactions on Image Processing, vol. 2, No. 2, Apr. 1993, pp. 176-201.

Carlson, M.A., et al., "An Automated, Handheld Biosensor for Aflatoxin," Biosensors & Electronics 14 (2000), pp. 841-848.

Delmulle, Barbara S., et al., Development of an Immunoassay-Based Lateral Flow Dipstick for the Rapid Detection of Aflatoxin $B_1$ in Pig Feed, Journal of Agricultural and Food Chemistry, J. Agric. Food Chem. 2005, 53, pp. 3364-3368.

Tahir-Muhammad, Zarini, et al. "A Conductometric Biosensor for Biosecurity," Biosensors & Bioelectronics, Biosensors and Bioelectronics 18 (2003) pp. 813-819.

Niedbala, R. Sam, et al. "Detection of Analytes by Ummunoassay Using Up-Converting Phosphor Technology," Anal. Biochem. (2001), vol. 293, pp. 22-30.

\* cited by examiner

|  | Minutiae index | | | |
|---|---|---|---|---|
| Minutiae MPR | 1 | 2 | ...i... | M |
| MPR1 | q11 | q12 | q1i | q1M |
| MPR2 |  |  |  |  |
| MPR3 |  |  |  |  |
| MPRu | qu1 | qu2 | qui | quM |
|  |  |  |  |  |

|  | Search FP Minutiae Index | | | |
|---|---|---|---|---|
| DB FP Minutiae Index | 1 | 2 | ...i... | M |
| 1 | qual_11 | qual_12 | qual_1i | qual_1M |
| 2 | qual_21 | qual_22 | qual_2i | qual_2M |
| 3 | | | | |
| U | qual_u1 | qual_u2 | qual_ui | qual_uM |
| N | qual_N1 | qual_N2 | qual_Ni | qual_NM |

*FIG. 9*

|  | Search FP Minutiae Index | | | |
|---|---|---|---|---|
| DB FP Minutiae Index | 1 | 2 | ...i... | M |
| 1 | qual_11 | qual_12 | 0 | qual_1M |
| 2 | qual_21 | qual_22 | 0 | qual_2M |
| 3 | | | | |
| U | 0 | 0 | 0 | 0 |
| N | qual_N1 | qual_N2 | 0 | qual_NM |

*FIG. 10*

SYSTEM AND METHOD FOR FAST BIOMETRIC PATTERN MATCHING

CROSS-REFERENCE TO RELATED APPLICATION

This application is a Continuation of U.S. patent application Ser. No. 11/271,411, filed Nov. 9, 2005 now U.S. Pat. No. 7,616,788 which claims the benefit of the filing date of U.S. Provisional Patent Application Ser. No. 60/627,275, filed on Nov. 12, 2004 and entitled "System and Method For Fast Biometric Pattern Matching," the entire content of which is hereby expressly incorporated by reference.

FIELD OF THE INVENTION

The present invention relates generally to biometric data identification; and more particularly to an efficient and flexible biometric data identification system and method.

BACKGROUND OF THE INVENTION

High-security biometric-based identification systems are fast evolving. Applications of these systems include identification of individuals for law enforcement purposes, limiting access to secure facilities, and information and verification of an individual's identity. These identification systems include the use of biometrics such as, fingerprints, voice analysis, retinal scans, iris scans, or the like.

Among different types of biometric measures, fingerprint has proven to be one of the most cost-effective methods for large-scale personal identification. One of the applications of the fingerprint recognition is fingerprint identification (i.e., a 1:N matching). A typical fingerprint identification process includes matching an input fingerprint (search fingerprint) to a database of previously collected fingerprint images to determine a person's identity.

A fingerprint image may originate from scanning of a finger, ink cards, from a palm, or latent prints. Different applications of fingerprint identification have different requirements. For example, the database size can range from hundreds of thousands to millions of images and the fingerprint images may vary in quality and size depending on their source.

Among many factors that may have an impact on the successful adoption of any Automatic Fingerprint Identification System (AFIS) in larger markets, system performance and cost are commonly considered as critical. A fingerprint database typically includes hundreds of thousands of fingerprint images from different sources. As the size of the database increases, the image quality and accuracy generated from the processing stage and the performance of the matching stage become critical to the overall system performance, that is, identification, accuracy, and response time of the system.

A major challenge of fingerprint identification systems is how to speed up the matching process without substantially compromising accuracy. To reduce the matching time, different approaches have been applied. For example, fingerprint classification, such as a four-class or five-class (whorl, left loop, right loop, arch and tented arch) scheme is commonly used to reduce the matched (candidate) list. For instance, a fingerprint with an arch does not need to be matched with those fingerprints consisting of whorls only. However, these classifications are not reliable in many cases and often cause misclassification. Another current approach is to utilize minutia information (i.e., discrete features on fingerprints) of the input fingerprint to reduce the number of matches. However, this minutia approach, while leading to a high degree of accuracy is substantially slow in processing.

Thus, seeking a better approach with high matching accuracy, high reduction rate, and short reduction time remains a challenge. Accordingly, there is a need for a scalable and configurable system for accommodating a variety of different applications for biometric matching and identification.

SUMMARY OF THE INVENTION

The present invention provides an improved method and system for an efficient and flexible biometric data, such as a fingerprint, facial images, eye iris, retina images, and the like matching.

In one embodiment the present invention is a scalable and configurable system for accommodating a variety of different applications for biometric data, such as, fingerprint identification.

In one embodiment the present invention is a method for matching two biometric images. The method includes receiving an input biometric image; generating an index table for the input biometric image, wherein the index table includes a quality quantity for each minutia of the input biometric image; receiving a second biometric image; generating a number of patterns for a first minutia of the second biometric image; associatively accessing the index table by the generated number of patterns; accumulating quality quantities accessed from the index table for each minutia of the input biometric image for the number of patterns of the first minutia of the second biometric image; and selecting a minutia candidate of the input biometric image responsive to the accumulated quality quantities.

The method may further comprise repeating the generating, associatively accessing, accumulating and selecting steps for each minutia of the second biometric image, and generating a match score for the second biometric image.

In one embodiment the present invention is a system for matching two biometric images. The system includes an input buffer for receiving an input biometric image; a memory or storing an index table for the input biometric image, wherein the index table includes a quality quantity for each minutia of the input biometric image; a database for storing a second biometric image; means for generating a number of patterns for a first minutia of the second biometric image and associatively accessing the index table by the generated number of patterns; a plurality of accumulators for accumulating quality quantities accessed from the index table for each minutia of the input biometric image for the number of patterns of the first minutia of the second biometric image; and a plurality of comparators for selecting a minutia candidate of the input biometric image responsive to the accumulated quality quantities.

The biometric images maybe fingerprint images, eye iris images, retina images, facial images, or the like.

DETAILED DESCRIPTION

In one embodiment, the present invention is a method and system for accurate and fast identification and matching of biometric images, such as fingerprint images. In one embodiment of the present invention, a spatial pattern between extracted fingerprint minutiae is used to reduce the search space at a high reduction rate while retaining a high level of accuracy.

Figure 1:
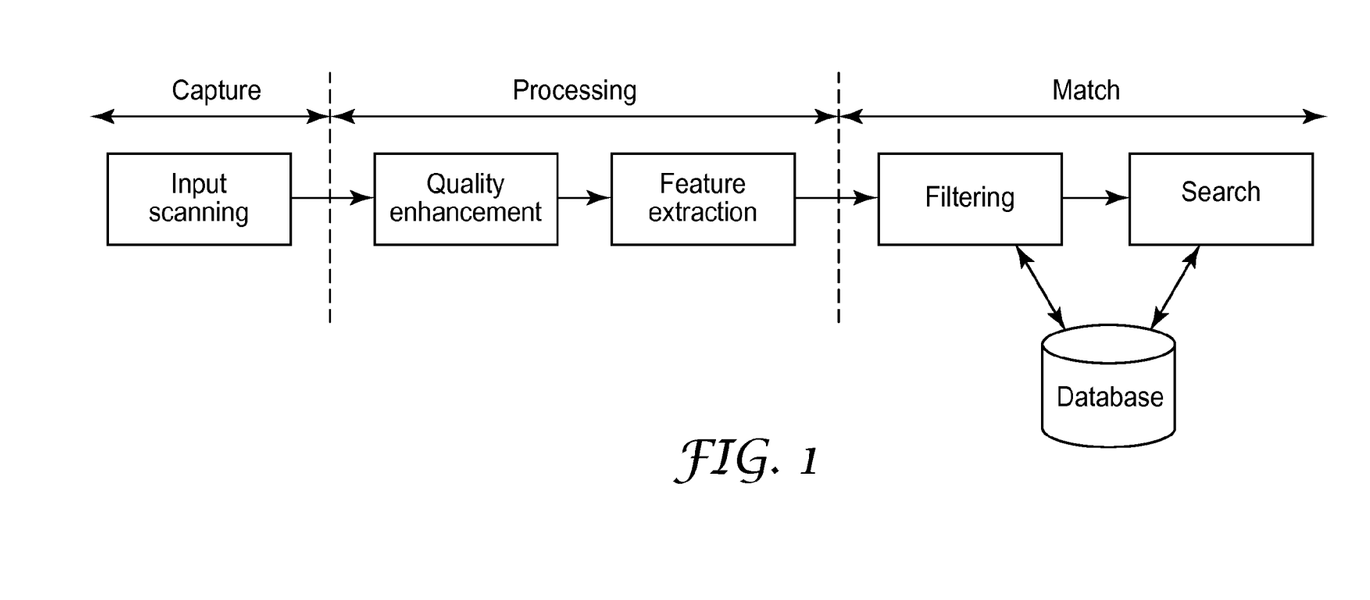
FIG. 1 is an exemplary biometric identification process, according to one embodiment of the present invention.

As shown in FIG. 1, a biometric identification process such as a fingerprint identification process includes three main stages: a capturing stage, a processing stage, and a matching stage. The capturing stage gathers an input fingerprint to be identified. The processing stage processes the captured fingerprint to enhance its quality and extract its features. The processing stage then converts the input fingerprint into a format that is suitable for matching against some existing fingerprints stored in a fingerprint database. The matching stage uses the processed input fingerprint to filter out (match) a list of candidate fingerprints from the database and then applies some criteria to obtain one or few matched fingerprints.

Typically, there are 100 to 500 minutiae on an inked fingerprint image. Minutiae data is statistically more stable, more invariant, and more tolerant to faults that are introduced in fingerprint image capturing stage, than other types of fingerprint features (such as class, core, and delta). The present invention exploits the high level of parallelism in fingerprint matching through the use of parallel processing techniques, and reduces the computing time to a linear function of the number of minutiae feature points for each fingerprint.

In one embodiment, to speed up the comparison of the biometric images, a technique similar to addressing scheme of an associative memory is used. Although fingerprint images are used as examples to describe various embodiments of the present invention, the present invention is not limited to pattern matching of fingerprint images. Other biometric images, such as eye iris images, retina images, facial images, and the like are also within the scope and capability of the present invention. That is once the distinct features of an eye iris images, a retina images, a facial images, or the like are extracted, the efficient pattern matching approach of the present invention can be used to match a biometric search candidate to a biometric database.

Figure 2:
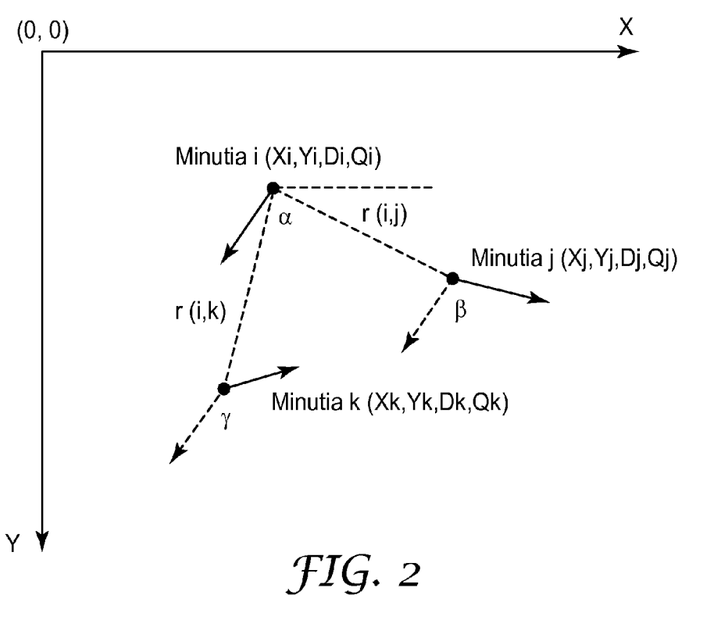
FIG. 2 depicts an exemplary diagram for representing minutiae of a biometric image, such as a fingerprint.

FIG. 2 depicts an exemplary diagram for representing minutiae of a fingerprint. Generally, two fingerprints are compared using their respective discrete features called minutiae. Minutiae are typically defined as feature points in a finger's fraction skin where ridges end (ridge ending) or split (ridge bifurcation), as described in U.S. Pat. No. 4,151,512, the entire content of which is hereby incorporated by reference. Typically, there are 100 to 500 minutiae on a fingerprint image ink. The system of the present invention is capable of processing biometric images such as, fingerprints with arbitrary number of minutiae, and a configurable parameter P can be selected to optimize the system performance in terms of accuracy and speed.

As shown, each minutia point is represented by its location vector (X, Y, D, Q). X and Y indicate coordinate locations of each detected minutia and D indicates the angular orientation of each detected minutia. Furthermore, a quality factor Q may be included with each minutia point to indicate the quality of each minutia point. For example, a high quality value of 15 may be assigned to a minutia point where the surrounding image is more clear, and a low quality value of 0 may be assigned to a minutia point where its surrounding image is blur, such that it is difficult to verify the existence of the minutia.

For example, as shown in FIG. 2, minutiae i is located in (xi, yi), its direction is di and the image quality around this minutia is qi. Minutiae j is located in (xj, yj), its direction is dj and the image quality around this minutia is qj. Similarly, minutiae k is located in (xk, yk), its direction is dk and the image quality around this minutia is qk.

In one embodiment, the present invention creates a special pattern over the fingerprint minutiae to make the fast scalability matching possible. In one embodiment, relationships between each adjacent minutia pairs namely, Minutiae Pair Relation (MPRs), are used for comparison of two fingerprints to speed up the filtering and matching process. For example, MPR (i, j) represents the geometric relations between minutia i and minutia j; MPR (i, k) represents the geometric relations between minutia i and minutia k; and MPR (k, j) represents the geometric relations between minutia k and minutia j. Each MPR (i, j) for minutiae i and j is defined as:

$$MPR(i,j)=(\alpha,\beta,r), \text{ where,}$$

$$\alpha = \arctan(\Delta x/\Delta y) - Di;$$

$$\beta = Di - Dj;$$

$$r = SQRT(\Delta x^2 + \Delta y^2); \text{ and}$$

$$\Delta x = Xj - Xi;$$

$$\Delta y = Yj - Yi;$$

Similarly, another minutiae relationship (that is, another type of pattern), namely, a Minutiae Triple Relations (MTR (i, j, k)) may be used to define a minutia with respect to two of its neighbor minutiae j and k. Each MTR is defined as:

$$MTR(i,j,k) = (r1, r2, \alpha1, \alpha2, \gamma, \beta), \text{ where}$$

$$r1 = SQRT((Xi-Xj)^2 + (Yi-Yj)^2);$$

$$r2 = SQRT((Xi-Xk)^2 + (Yi-Yk)^2);$$

$$\alpha1 = \arctan((Xi-Xj)/(Yi-Yj)) - Di;$$

$$\alpha2 = \arctan((Xi-Xk)/(Yi-Yk)) - Di;$$

$$\gamma = Di - Dk; \text{ and}$$

$$\beta = Di - Dj;$$

According to an embodiment of the invention, fingerprint matching is based on the comparison of the MPR and/or MTR relationships (patterns). Assuming that an input (search) fingerprint is being compared to a database of fingerprints, all of the minutiae of the input fingerprint need to be compared to the minutiae of each of the fingerprints stored in the database.

Each fingerprint read from the database (database fingerprint) is matched with the input fingerprint and is scored based on the number and quality of the MPR (and/or MTR) matches.

Figure 3:
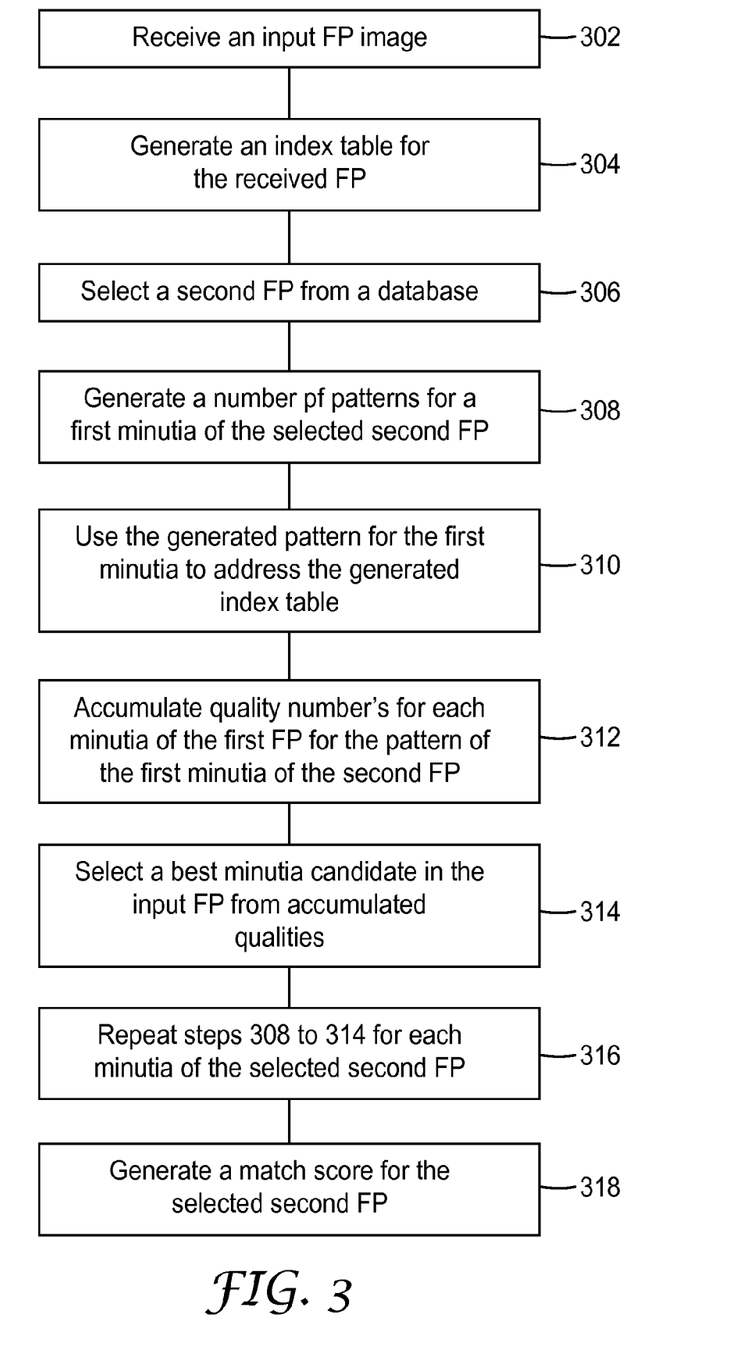
FIG. 3 is an exemplary process flow diagram for the matching process, according to one embodiment of the present invention.

FIG. 3 is an exemplary process flow diagram for the matching process, according to one embodiment of the present invention. An input fingerprint (FP) to be matched against the database of fingerprints is received in block 302. In block 304, an index table is generated for the received fingerprint. In one embodiment, the index table includes the MPR matching quality (a MPR similarity measurement) for each minutiae in the search fingerprint. The index table is described below in more detail.

In block 306, a fingerprint from the database is accessed. A number of patterns (e.g., MPRs or MTRs) are generated for each minutiae of this fingerprint in block 308. In one embodiment, the number of generated patterns (the parameter, P) is programmable by the user. The generated patterns are then used to address the index table in block 310. The entries in the index table (e.g., MPR matching quality for each minutiae of the input fingerprint) are then accumulated for all P patterns of a particular minutiae in the database fingerprint in block 312.

In block 314 a best minutiae candidate in the input fingerprint is identified for the particular (e.g., first, second . . . ) minutiae of the database fingerprint. In one embodiment, the candidate is selected by selecting the minutiae in the input fingerprint that has the maximum value of the accumulated MPR matching quality. At this point, a matched minutiae candidate in the received input fingerprint is identified for a given minutiae of the database fingerprint.

Processing in blocks 308 to 314 are then repeated in block 316 for each of the minutiae of the database fingerprint to obtain a list of matched minutiae pairs in the input and database fingerprints. In block 318 a match score is calculated for the database fingerprint and stored in memory. The process may be repeated for all or some of the other fingerprints in the database and the matched scores are compared to determine one or more fingerprints from the database that best match the input fingerprint.

Figure 4:
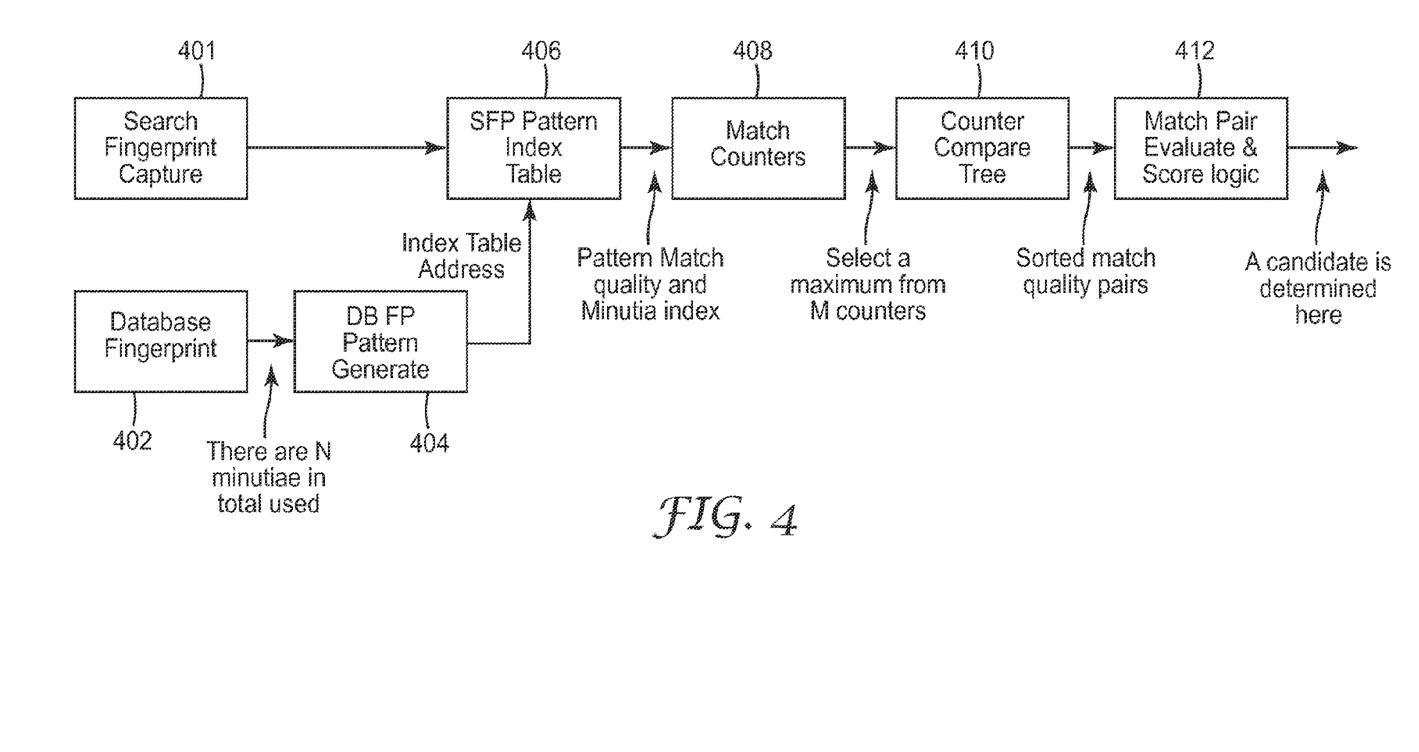
FIG. 4 shows an exemplary matching hardware block diagram, according to one embodiment of the present invention.

Assuming there are M minutiae in the input fingerprint, and N minutiae in a second fingerprint read from the database, an exemplary matching hardware block diagram is depicted in FIG. 4, according to one embodiment of the present invention.

As shown, when a search fingerprint is received, M*(M−1) MPR patterns, and/or M*(M−1)*(M−2) MTR patterns are calculated for the input fingerprint 401 and an index table 406 (described below) is created with these calculated MPRs. Likewise, for the fingerprint read from database, N*(N−1) MPR patterns 404 (and/or N*(N−1)*(N−2) MTR patterns) are calculated. The generated MPR patterns 404 for the second fingerprint 402 are used as addresses pointing to locations of the index table 406. The stored minutiae index numbers and the respective quality values corresponding to the address are then obtained to statistically determine the similarities between the minutiae in the search fingerprint and the minutiae in the database fingerprint.

In one embodiment, the outputs of each column of the index table 406 corresponding to respective minutiae of the input fingerprint (first column for first minutiae . . . ) are a MPR matching quality for the respective minutia. The quality value outputs of each column are then added in respective match counters 408. A counter/compare tree 410 then sorts the match quality pairs. A minutia with the maximum accumulated quality value is selected as the pair candidate to the minutiae in database A match pair evaluate and score logic 412 evaluates and scores the set of match pair and match quality from the index table 406. For example, a minutia t in the search fingerprint may match to minutia u and minutia v in the database fingerprint. The match pair evaluate and score logic 412 determines which pair is a better match pair. Finally, a matching score of the two fingerprints is generated based on the minutiae pairs and its corresponding quality values in evaluate and score logic 412.

Figure 5:
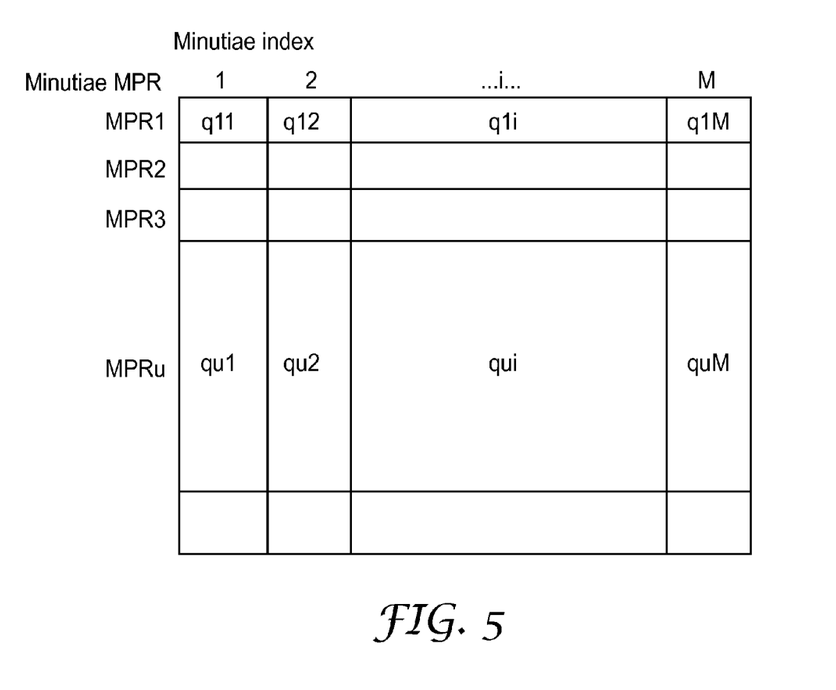
FIG. 5 depicts an exemplary index table, according to one embodiment of the present invention.

To simplify the description of some embodiments, from now on, MPRs are used to describe the operation of some embodiments of the present invention. FIG. 5 depicts an exemplary index table, according to one embodiment of the present invention.

In this embodiment, the values ($\alpha$, $\beta$, r) in a MPR are normalized into integers with (A+B+R) bit: $0 \leq \alpha < 2^A$, $0 \leq \beta < 2^B$ and $0 \leq r < 2^R$, and a MPR ($\alpha$, $\beta$, r) is valued as an integer $\alpha * 2^{B+R} + \beta * 2^R + r$.

In this embodiment, the pattern index table comprises an array of memory cells arranged in $2^{(A+B+R)}$ rows and M columns. In other words, the index table is a two dimensional matrix, where the column is minutia index number and the row is MPR values. The content of each cell of this matrix represents the best matching quality of the row MPR value to the MPRs generated by the minutiae corresponding to column index in the search fingerprint. For example, if all MPRs generated by minutiae i in the search fingerprint are {MPR1, MPR2, . . . MPRi−1, MPRi+1, . . . MPRm}, where MPRj represents MPR(i,j), when comparing these MPRs to a given MPR value k, the MPR matching qualities for a MPR value k are {q1, q2, . . . qi−1, qi+1, . . . qm}. If the maximum value of these qualities be qui (qui=MAX(q1, q2, . . . qi−1, qi+1, qm)), then the content in the cell addressed be raw k and column i is qui. By filling every row and column as described above, the index table can be constructed from the search fingerprint.

Even though there are N*(N−1) MPR patterns in every database fingerprint, it is not necessary to use all of them in the fingerprint matching. A smaller set of MPRs can reasonably represent a database fingerprint. In one embodiment, the invention comprises a MPR finder pipeline. For minutiae in the database fingerprint, the invention generates all N−1 MPRs, and sorts the MPRs according a criteria matrix, such as the relative position of two minutiae and sum of qualities of the two minutiae, only first P MPRs after sorting are included in a useful MPR set. The useful MPR set is then stored in a buffer. The number of MPRs for each minutiae used in the matching process (i.e., P) depends on many external and statistical factors. However, this number is scalable/programmable in the present invention. A higher value of P results in more accurate matches, however, it will slow down the process.

In one embodiment, based on historical data, an optimum value of 10 is chosen for the value of P. In such embodiment, after the MPR generation and sorting, 10 MPRs will be used to look up the index table for each minutiae in the database fingerprint and a matching minutiae pair will be selected based on the accumulated matching qualities. The entire process can be pipelined and the matching process can be completed in 10*N clock cycles for N minutiae in the database fingerprint. Generally, one fingerprint match process can be completed in N*P clock cycles where, N is the number of minutiae in the database fingerprint and P is the number of MPRs used for each minutiae in the database pattern set to address the index table. Because P is much smaller than N (for example 10, in a typical case), the complexity of the match process is in the order of N(1).

In one embodiment, the MPR matching quality can be simplified to a binary value where a '1' means match and a '0' means no match. In such embodiment, the index table size for each row is reduced to M bits.

In one embodiment, for each search (input) fingerprint to be matched against the database, a new index table is generated. The index table is organized as a two dimensional array, with $2^{(A+B+R)}$ rows and M columns, each cell contains a matching quality represented by a single bit or multiple bits. In one embodiment, the process of generating the index table from the search fingerprint includes three steps: (1) generating MPRs, (2) initializing the index table, and (3) accessing the index table.

In step (1), for every minutia in the search fingerprint, all the MPRs are calculated. In step (2), the entire index table is cleared to all zeros. In step (3), the MPRs generated from each minutiae are then used to calculate all matching qualities for the corresponding column by evaluating the quality of the best match for all these MPRs.

As discussed above, generally, it is not necessary to compare all the MPRs of the second fingerprint to the MPRs of the search fingerprint. For every minutia of the second fingerprint, the meaningful MPRs are those which are generated by the minutiae reasonably close to that minutia. The invention thus limits the MPR generation to only the pairs within a predetermined distance. Thus, in one embodiment, the invention does not generate MPRs for minutiae farther than the predetermined distance. If there are too many minutiae within that distance range, the invention uses only those minutiae which are closer to that minutia. This further reduces the calculation complexity of the MPR generation. Assuming 10 MPRs of the database fingerprint are used (i.e., P=10 based on some empirical data) for every minutia, the MPR calculations is then reduced to N*10.

As mentioned before, fingerprint feature patterns typically change in different fingerprint capture conditions and with different feature extraction algorithms. The matching filter of the present invention is made even more adaptive and flexible by taking into account these variations. In the process of generating the index table mentioned above, the step (3) uses the fingerprint minutiae distortion knowledge to evaluate the how well two MPRs match. To further reduce the calculations needed to compare all MPRs from the search fingerprint to all MPR values for row addresses, the invention uses the concept of redundant MPR pattern generating. This process generates redundant MPRs based on the minutiae variation pattern for the generation of MPR matching qualities.

In one embodiment, the invention uses 4-bits to represent the 16 MPR matching quality level (0~15). The higher this number, the better two MPRs match. For example, for a MPR including $\beta=8$, $\alpha=10$, $r=37$, the invention not only writes a 15 to the corresponding location in the index table where the row address is the MPR value of $\{10,8,37\}$, it also generates some redundant MPRs in the allowed tolerance ranges. That is, for the above example:

$7<=\beta<=9$ (tolerance is +1)
$9<=\alpha<=11$ (tolerance is +1)
$33<=r<=41$ (tolerance is +4)

The sum of these adjustable error factors is then used to set a quality for that pattern. That is Quality=15−(|delta $\beta$|+|delta $\alpha$|+|delta r|). As the example above, the table making process will assign to the cell with row address $\{1, 9, 35\}$, a value of 11.

In one embodiment, the index table utilizes a static RAM. In one embodiment, the search fingerprint index table is generated in software.

For example, using an M array of static RAMs with 18-bit address and 4-bit data, all the MPR patterns of the search fingerprint can be mapped to the addresses A17~A0 where, $\alpha$=>A5~A0; $\beta$=>A11~A6; and r=>A17~A12.

Assuming there are N minutiae in the database fingerprint, M minutiae in the search fingerprint, there would be M*(M−1) MPRs in the search fingerprints, and N*(N−1) MPRs in the database fingerprint. Comparing all of these MPRs needs N*(N−1)*M*(M−1) operations. In one embodiment, the invention stores all M*(M−1) search MPR patterns in the pattern index table and compares the pattern by accessing one of the N*(N−1) patterns of the database fingerprint to be matched. All possible search patterns are read from the index table, counted and scored.

As a result, the invention reduces the comparison time from $O(M^4)$ to $O(M^2)$. By utilizing the parameter P to limit the number of MPRs required for each minutiae in the database fingerprint, the invention can be implemented by a parallel pipeline architecture to achieve a higher matching speed.

Figure 6:
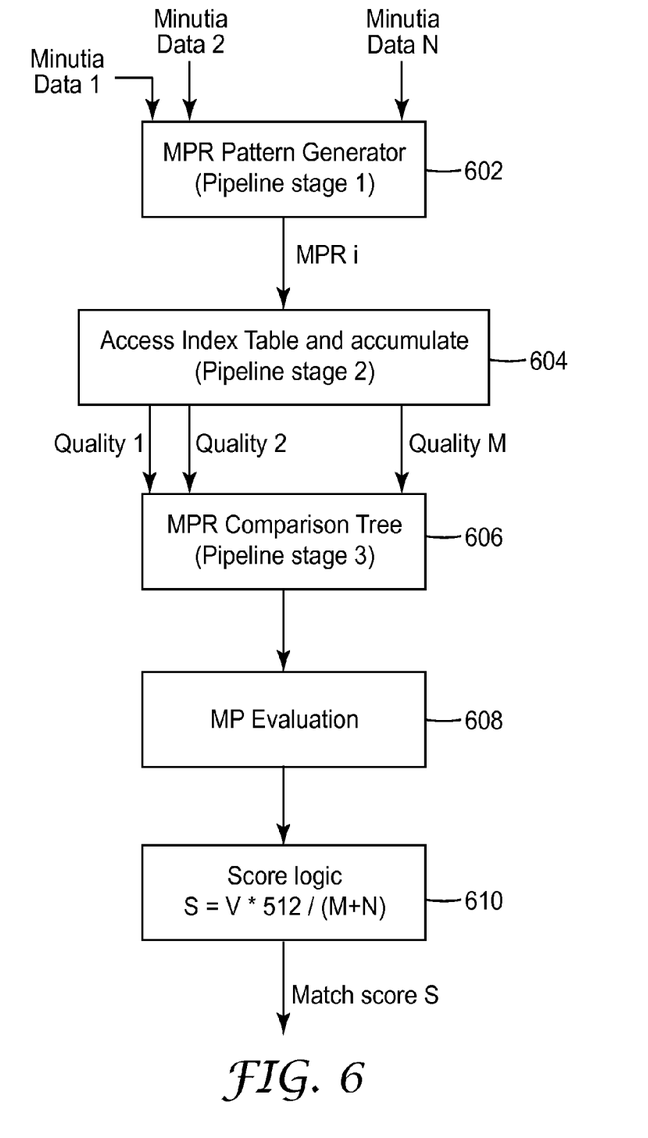
FIG. 6 is an exemplary block diagram of a matching pipeline, according to one embodiment of the present invention.

FIG. 6 shows an exemplary block diagram of a matching pipeline. In one embodiment, the pipeline is implemented at the M*10 speed, where the matching time is equal to (M*10*Cycle time). As shown, there are five stages in the pipeline to generate the matching pair. First stage 602 generates the MPR patterns for the database fingerprint on the fly. In the second stage 604, the index table is looked-up and the quality value is accumulated. The third stage 606 includes the comparison tree for selecting a matching candidate minutia by choosing the column index which has highest accumulated quality value. The outputs of the third stage 606 are matching minutiae pairs, and the matching pairs are evaluated by MP evaluation module 608 and final matching pair is feed to score logic 610 for match score calculation.

Figure 7:
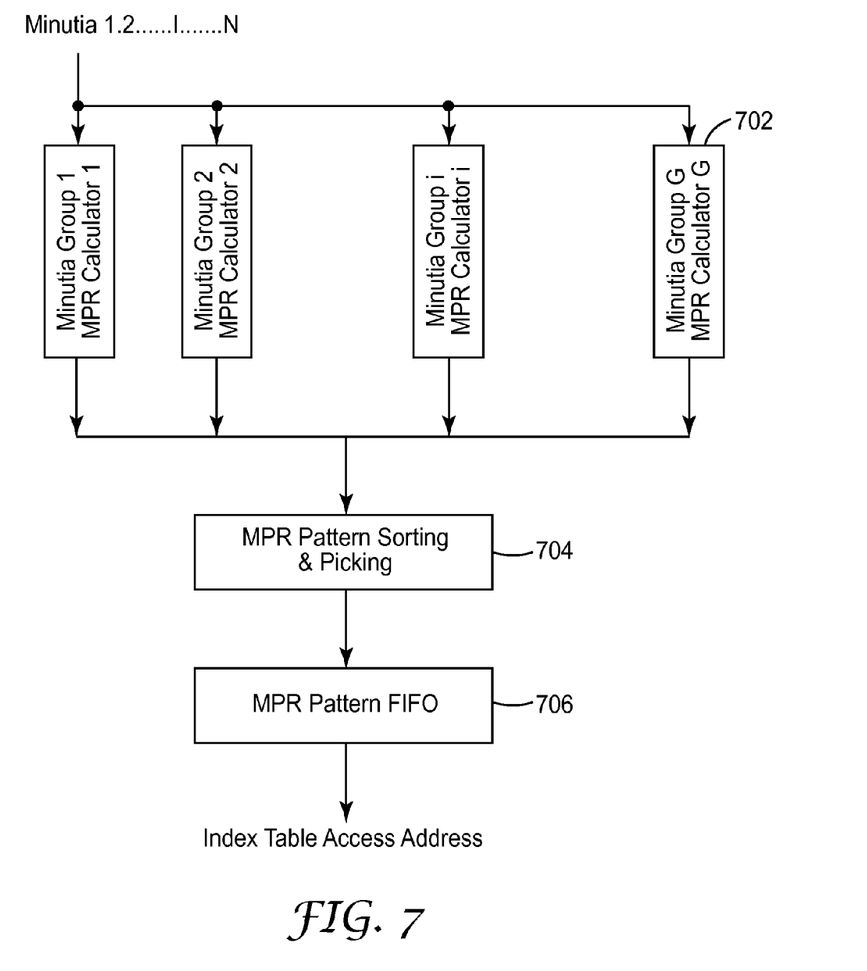
FIG. 7 is an exemplary block diagram of for pattern generation of a fingerprint, according to one embodiment of the present invention.

FIG. 7 is an exemplary block diagram of for the pattern generation of a database fingerprint, that is stage 1 of the pipeline. As shown, stage I generates a database (DB) fingerprint MPR pattern. For every minutia in the database fingerprint, (N−1) MPR patterns are created, however, only P (e.g., 10) MPR patterns are selected from a total of (N−1) MPRs.

Since N−1 MPR calculations needed for each minutiae, to ensure the MPR selection operation can be completed in P clock cycle, multiple MPR generators are needed. In one embodiment of the invention, the number of parallel MPR generators are determined by $G=N_{max}/P_{min}$, where, G is the number of MPR generators, $N_{max}$ is the maximum minutiae number in the database fingerprint and $P_{min}$ is the minimum value of P parameter. For example, in the embodiment with maximum 256 minutiae database fingerprint and minimum P parameter of 8, there should be 32 MPR generators.

Upon initialization of a database fingerprint match, the N minutiae of the fingerprint are evenly divided and loaded into the G generators. During matching, each minutia (1 to N) is fed to these G MPR pattern generators 702i at the input port of the pipeline and up to P MPR patterns are generated at the output port of each MPR generator in P clock cycles. The MPR pattern sorting and picking unit 704 takes all MPRs generated by G generators (total can be up to N−1 MPRS) and then selects the best P (e.g., 10) MPRs according to the MPR selection criteria.

The MPR selection criteria used in block 704 of this invention is based on the analysis of the fingerprint minutiae distortion and its relationship to the MPR, the locality, the minutiae distribution in the area and minutiae quality are used. The following steps describe the MPR selection criteria used in one embodiment:

1. Selecting a MPR based on a predefined distance, the minutiae with distances larger than the predefined value are ignored;
2. Sorting the MPRs that meet the distance criteria, based one the minutiae quality; and
3. Selecting up to P best MPRs from the sorted list of MPRs.

To reduce the computational complexity in block 704, the distance filtering is carried out at MPR generators. Only the MPRs that meet the distance are generated, and the generated MPRs in each generator are sorted according to the minutiae quality before they are output to block 704.

The selected MPR patterns are then stored in FIFO 706 and used as access addresses for the index table.

Figure 8:
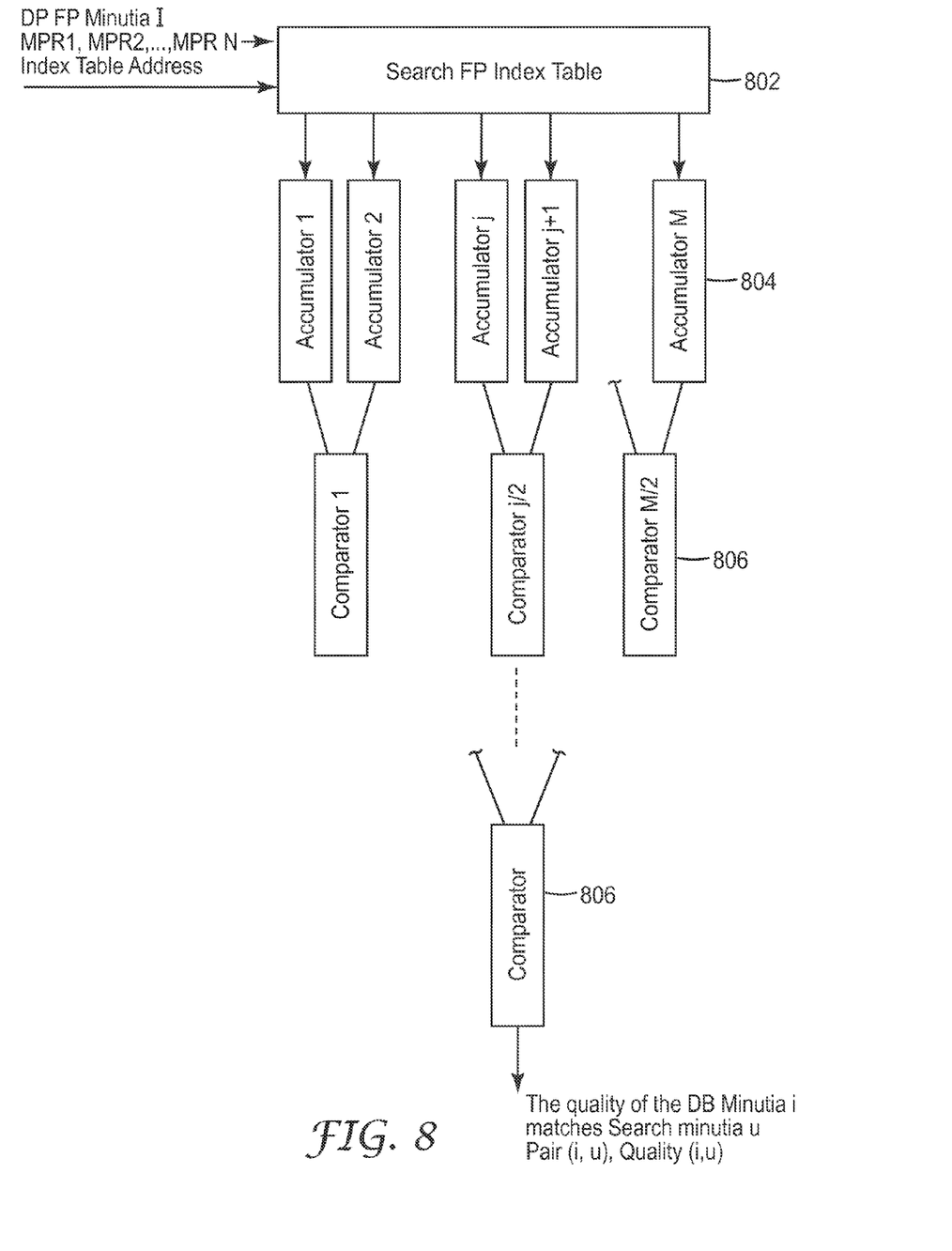
FIG. 8 is an exemplary block diagram of some pipeline stages, according to one embodiment of the present invention.

The pipeline stages 2 and 3 of FIG. 6 are depicted in more detail in FIG. 8. As shown in FIG. 6, the MPRs (up to P MPRs for each minutiae in database fingerprint) generated from 602 are used as address to access the index table 802 generated from the search fingerprint. The outputs from the index table 802 are MPR matching qualities for all M minutiae in the search fingerprint for the given address MPR.

For each minutiae of database fingerprint, there will be up to P MPRs to address the index table and generate up to P MPR matching qualities. These MPR matching qualities are then accumulated by the M accumulators 804. A comparison tree structure including comparators 806 organized as a tree structure compares the accumulated values and outputs the maximum accumulated matching qualities and the index of the accumulator which has the maximum value, such a matching pair can be determined. For example, if the parameter P is 10, and 10 MPRs were selected (e.g., from stage 602 in FIG. 7) for the $i_{th}$ minutiae in database fingerprint, these 10 MPRs are used as addresses to access the index table then, 10 sets of MPR matching qualities output from the index table are accumulated in M accumulators 804.

The accumulated values in the 10 accumulators 804 are then compared by the comparison tree. Suppose the $u_{th}$ accumulator has the maximum value (V), then the matching pair (i, u, V) is determined, that is, the $i_{th}$ minutiae in database fingerprint is matching the $u_{th}$ minutiae in search fingerprint with a matching quality of V.

For every minutiae in the database fingerprint, the processes of MPR selection, index table access, accumulate and comparison are carried out in the pipeline structure (e.g., stages 602, 604 and 606 in FIG. 6), and the N matching pairs are generated as the output of stage 606. By properly constructing the pipeline, the pipeline stages 602, 604 and 606 work in parallel, each module processing one database fingerprint in N*P clock cycles.

Assuming P is 10, at stage 606, after 10*N clock cycles, a set of matching pairs {(1, p1, q1), (2, p2, q2), (3, p3, q3), . . . , (n, pn, qn)} are obtained, where p1 is the index of minutiae in search fingerprint that matches to $1^{st}$ minutiae in database fingerprint with a match quality of q1. Based on these matching pairs, MPR evaluation (block 608 of FIG. 6), and scoring of the matched MPR pairs (block 610 of FIG. 6), the invention determines how well the database fingerprint matches the search fingerprint. With a carefully selected threshold, whether two fingerprint match can be determined.

The matching pairs generated from 606 may contain false pairs and duplicated pairs such as (v, I, qv) and (u, I, qu) both in the matching pair list. That is, a minutia i in the search fingerprint may match both to minutiae u and minutiae v in the database fingerprint. The system and method of the present invention eliminate the false and duplicated pairs to generate matching pairs with high confidence.

Figure 9:
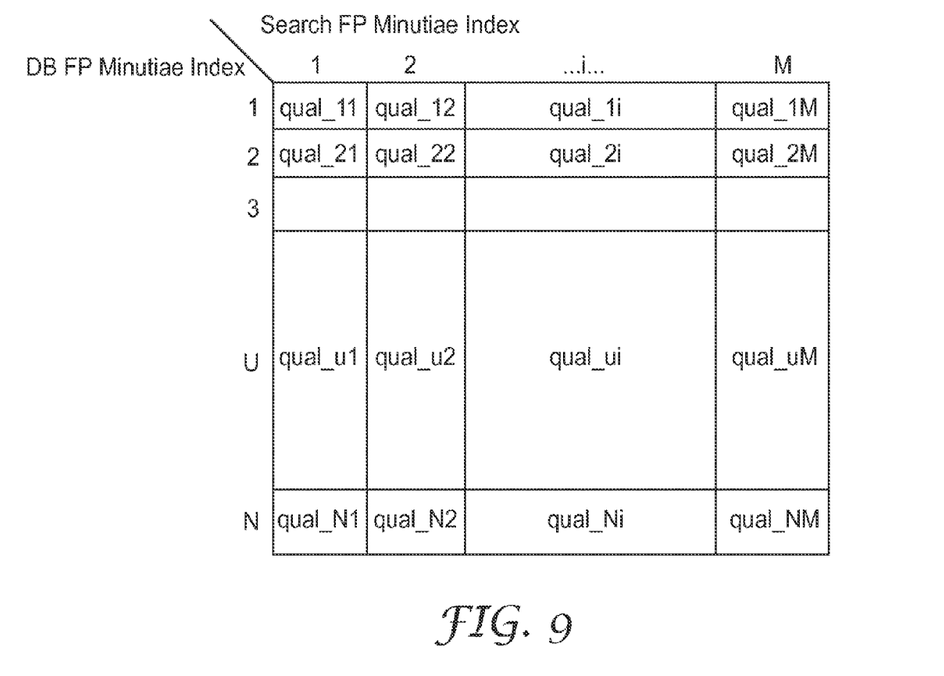
FIG. 9 depicts an exemplary match pair quality matrix, according to one embodiment of the present invention.

FIG. 9 depicts an exemplary match pair quality matrix to eliminate the duplicated pairs, according to one embodiment of the present invention. As shown, the matrix saves the match quality of every match pair. The rows represent DB fingerprint minutiae index and the columns represent search fingerprint index. The contents of the matrix are initialized to zero, and a matching pair (u, i, qual_ui) is filled into the matrix at row u, column i and content set to qual_ui. If a column does not have any non-zero contents, there is no database fingerprint minutiae matches the corresponding search fingerprint minutiae. Likewise, if there are more than one non-zero contents in the column, multiple database fingerprint minutiae match this single search fingerprint minutiae.

Figure 10:
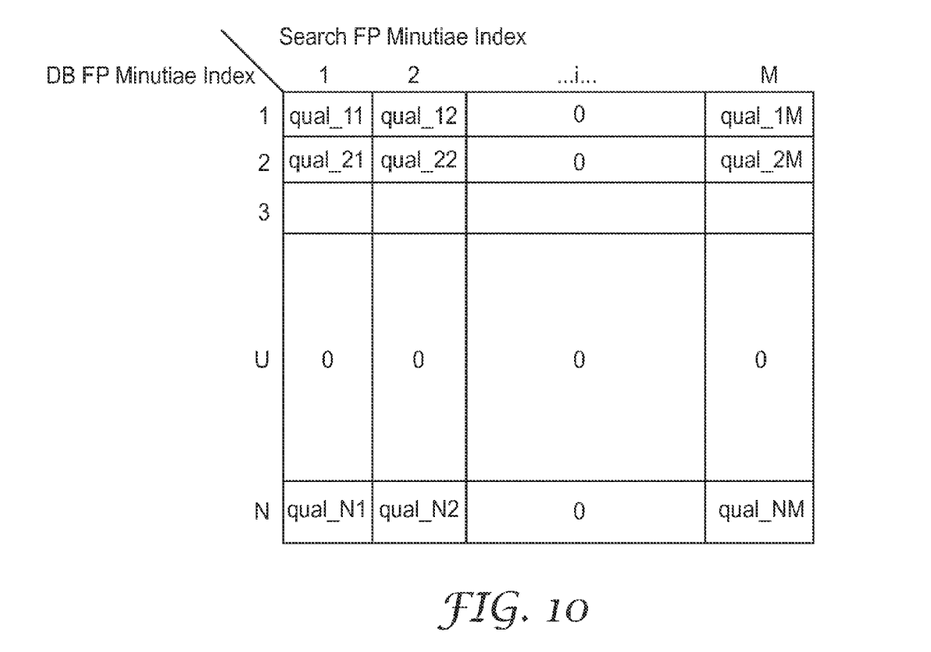
FIG. 10 depicts exemplary selection and filling process for a fingerprint minutia, according to one embodiment of the present invention.

Because every minutia of the search fingerprint can only match one minutia of the database fingerprint, the largest value of the entire matrix in the location row u and column i is selected and u and i are determined to be a match pair. Then the entire u row and i column are filled with zeros, as shown in FIG. 10. The selection and filling process are repeated for all of the database fingerprint minutiae, that is, N times. The duplicate match pairs are then deleted.

To eliminate the false matching pairs, a transformation parameter consistent measurement approach is used in the invention. For example, MP $\{mp_1, mp_2, \ldots, mp_i, \ldots, mp_n\}$ is a set of N match pairs, where $mp_i=\{k(x_i,y_i,d_i), l(u_i,v_i,w_i), mq_i\}$; $k(x_i,y_i,d_i)$ is the $k^{th}$ minutia in the first fingerprint and $x_i$, $y_i$, $d_i$ is its location and direction in the image space; and $l(u_i,v_i,w_i)$ is the first minutia in the database fingerprint, $u_i, v_i$ is its location in the image space and $w_i$ is its direction. As described above, there is also a quality associated with each matched pair from the accumulator $mq_i$.

If the two fingerprints are taken from the same finger, then after mapping one of the fingerprint image to the other one, most MP pairs will have similar matches. In other words, most of the matched pairs in the MP set are consistent or likely matches. But if the two fingerprints are not from the same finger, then a consistent match will not be found.

For example, when mapping $mp_i$ $k(x_i,y_i,d_i)$ to $l(u_i,v_i,w_i)$, the following transformation parameters are obtained:

$\gamma_i=d_i-w_i;$ $mx_i=\cos(\gamma)*x_i-\sin(\gamma)*y_i-u_i;$ $my_i=\cos(\gamma)*y_i+\sin(\gamma)*x_i-v_i;$ After calculating the transformation parameters for all match pairs, an array of N transformation parameters, $TP=\{T_1, T_2, \ldots T_N\}$, can be obtained. Where $Ti=\{\gamma_i, mx_i, my_i\}$ is the transformation parameter to map matching pair $pm_i$.

The two transformations Ti and Tj are deemed to be consistent, if the difference between the two transformation parameters is in an allowed error range. For example, the difference between Ti and Tj can be calculated as follow:

delta_$\gamma=|\gamma_i-\gamma_j|;$ delta_$x=|mx_i-mx_j|;$ delta_$y=|my_i-my_j|;$ If the allowed error range is defined as {15, 10, 10}, transformations Ti and Tj are consistent, if delta_$\gamma$<15 and delta_x<10 and delta_y<10.

The value of the maximum number of consistent transformation parameters in the TP indicates how good the given two fingerprints match each other. To determine the best transformation which has the maximum number of consistent transformation parameters in TP, every transformation parameter is compared with all other transformation parameters, that is, N*(N−1) comparisons are required to find the best transformation parameter.

To reduce the number of comparisons, in one embodiment, in the matching pair evaluation process, the match pairs are first sorted according to the MPR matching quality of each pair. Only the first L (for example, 20) pairs with highest quality are compared to all match pairs in MP set and the number of consistent parameters are counted in parallel. By comparing these 20 values, the best transformation parameter can be determined.

When the best transformation parameter is determined, the match pairs with inconsistent transformation parameter can be eliminated.

In the above mentioned transformation parameter consistent measurement process, the original matching quality and the degree of mismatch between two sets of transformation parameters can be included as a weighting factor.

The following example uses the degree of mismatch as the weight to find the best transformation parameter:
1. Calculate transformation parameters for all matching pairs;
2. Sort the matching pairs by MPR matching qualities;
3. Select first 20 matching pairs;
4. Initialize 20 accumulators to zero;
5. Compare every other matching pair to each of selected pairs and a weighted value is added to corresponding accumulator; and
6. The maximum value in 20 accumulators is located and the best transformation parameter is determined.

In the above mentioned step 5, to compare two matching pairs, the transformation difference delta_γ, delta_x and delta_y are first calculated, then the weight is calculated as following.

Compare the (delta_γ, delta_x, delta_y) values to the pre-defined error range (15, 10, 10), if either delta_γ is not smaller than 15, or delta_x is not smaller than 10 or delta_y is not smaller than 10, a weight of zero is assigned. Otherwise, following calculations are used to generate the weight value: weight=(15−delta_γ)+(10−delta_x)+(10−delta_y).

The duplicated matching pair elimination process and the false matching pair removal process can be used together or separately. For example, the output of the stage 604 (in FIG. 6) can be processed by duplicated elimination first and the resulting matching pairs then processed by false pair removal method. Alternatively, the output of module 604 is first processed by false pair removal and with duplicated pair elimination as optional.

Assuming the maximum value obtained above is V, the number of minutia points in the search fingerprint is M and the number of minutiae in the database fingerprint is N, the matching score of these two fingerprints is calculated as:

$$S=V*512/(M+N);$$

As shown in module 610 of FIG. 6, the output of this matching score S represents the overall evaluation on how well these two fingerprint match, and the transformation parameter which has maximum consistence count can be used for further analyzing the match of the two fingerprints.

The matching score between the search fingerprint and database fingerprint generated at module 610 varies depending on the system configuration such as whether the duplicated matching pairs is eliminated and the parameter settings such as, how many MPRs are selected. The matching score can be compared to a defined threshold to determine whether the database fingerprint is a match, needs further analysis, or not a match.

In one embodiment, a dynamic sorting of the matching score is implemented, where the matching score is first compared to a low threshold, and the database fingerprints with matching score lower than the threshold are determined as no-match. Then, the matching score is compared to high threshold and is marked as a match, if the score is greater than the high threshold. The remaining database fingerprints with matching scores between the low and high thresholds are sorted according to their matching scores and a pre-defined number of top candidates (for example, a 1% of the number of candidates in the database) are kept for further analysis.

As a result, the present invention is capable of extracting more reliable MPR patterns in a high quality fingerprint, obtaining a group of high quality matching pairs and generating accurate matching score. For example, the system and method of the present invention is capable of obtaining a sharp score peak and can get a high matching rate (matching hit). At the same time, the present invention can be implemented in a parallel pipeline hardware architecture to achieve high matching speed.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method performed by a computing device for matching two biometric images comprising:
   electronically receiving an input biometric image including a plurality of minutiae;
   electronically generating a plurality of input patterns for each minutia of the input biometric image;
   electronically generating an index table from the input biometric image, wherein the index table includes rows and columns and each cell of the index table includes a matching quality of a row with respect to the patterns generated from a respective minutia that corresponds to a column index number;
   electronically receiving a second biometric image including a plurality of minutiae;
   electronically generating a number of patterns for a first minutia of the second biometric image;
   associatively accessing the index table by the generated number of patterns;
   electronically accumulating quality factors accessed from the index table for each minutia of the input biometric image for the number of patterns of the first minutia of the second biometric image; and
   electronically selecting at least one minutia candidate of the input biometric image responsive to the accumulated quality factors.

2. The method of claim 1, wherein the second biometric image is selected from a plurality of biometric images stored in a database.

3. The method of claim 1, wherein the number of generated patterns for the first minutia of the second biometric image is user programmable.

4. The method of claim 1, wherein the biometric images are one or more of the group consisting of fingerprint images, eye iris images, retina images, and facial images.

5. The method of claim 1, further comprising repeating the generating, associatively accessing, accumulating, and selecting steps for each minutia of the second biometric image.

6. The method of claim 5, further comprising generating a match score for the second biometric image.

7. The method of claim 1, wherein the generating a number of patterns comprises generating a number of minutiae pair relation patterns for a first minutia of the second biometric image.

8. The method of claim 1, wherein the generating a number of patterns comprises generating a number of minutiae triple relations patterns for a first minutia of the second biometric image.

9. The method of claim 1, wherein the index table is a two dimensional matrix, each column is a minutia index number, each row represents a pattern of the input biometric image, and each cell of the matrix represents a quality of a respective pattern.

10. The method of claim 1, wherein each entry of the index table represents all minutia points of the input biometric image which have same patterns as the address to that entry.

11. The method of claim 1, wherein the generating a number of patterns comprises generating only patterns that are within a predetermined distance from the first minutia of the second biometric image.

12. The method of claim 1, wherein the quality factor includes redundant patterns in a predetermined error range.

13. The method of claim 6, wherein the generating a match score for the second biometric image comprises generating a plurality of matched minutia/quality pairs for each minutia of the second biometric image, selecting a best matched pair, and determining a match score for the selected best matched pair.

14. A system for matching two biometric images comprising:
   an input buffer for receiving an input biometric image including a plurality of minutiae;
   a associative memory for storing an index table generated from the input biometric image, wherein the index table rows and columns and each cell of the index table includes a matching quality of a row with respect to the patterns generated from a respective minutia that corresponds to a column index number;
   a database for storing a second biometric image including a plurality of minutiae;
   electronic circuit for generating a number of patterns for a first minutia of the second biometric image and associatively accessing the index table by the generated number of patterns;
   a plurality of accumulators for accumulating quality factors accessed from the index table for each minutia of the input biometric image for the number of patterns of the first minutia of the second biometric image; and
   a plurality of comparators for selecting at least one minutia candidate of the input biometric image responsive to the accumulated quality factors.

15. The system of claim 14, wherein the biometric images are one or more of the group fingerprint images, eye iris images, retina images, and facial images.

16. The system of claim 14, further comprising means for repeating the generating, associatively accessing, accumulating, and selecting steps for each minutia of the second biometric image and means for generating a match score for the second biometric image.

17. The system of claim 14, wherein the means for generating a number of patterns comprises generating a number of minutiae pair relation patterns for a first minutia of the second biometric image.

18. The system of claim 14, wherein the index table is a two dimensional matrix, each column is a minutia index number, each row represents a pattern of the input biometric image, and each cell of the matrix represents a quality of a respective pattern.

19. The system of claim 16, wherein each entry of the index table represents all minutia points of the input biometric image which have same patterns as the address to that entry.

20. A system for matching two biometric images comprising:
   means for receiving an input biometric image including a plurality of minutiae;
   means for assigning a quality factor to each minutia of the input biometric image;
   means for generating a plurality of input patterns for each minutia of the input biometric image;
   means for generating an index table from the input biometric image, wherein the index table includes rows and columns and each cell of the index table includes a matching quality of a row with respect to the patterns generated from a respective minutia that corresponds to a column index number;
   means for receiving a second biometric image including a plurality of minutiae;
   means for generating a number of patterns for a first minutia of the second biometric image;
   means for associatively accessing the index table by the generated number of patterns;
   means for accumulating quality factors accessed from the index table for each minutia of the input biometric image for the number of patterns of the first minutia of the second biometric image; and
   means for selecting at least one minutia candidate of the input biometric image responsive to the accumulated quality factors.

* * * * *

UNITED STATES PATENT AND TRADEMARK OFFICE
CERTIFICATE OF CORRECTION

PATENT NO. : 8,379,982 B2
APPLICATION NO. : 12/578469
DATED : February 19, 2013
INVENTOR(S) : Ming Hsieh It is certified that error appears in the above-identified patent and that said Letters Patent is hereby corrected as shown below:

<u>Title Page 2, Column 2 (Other Publications)</u>
Line 17, delete "Ummunoassay" and insert -- Immunoassay --, therefor.

<u>Column 5</u>
Line 67, delete "database" and insert -- database. --, therefor.

<u>Column 7</u>
Line 63, delete "{1," and insert -- {11, --, therefor.

<u>Column 8</u>
Line 37 (Approx.), delete "stage I" and insert -- stage 1 --, therefor.

<u>Column 9</u>
Line 5, delete "one" and insert -- on --, therefor.

<u>Column 10</u>
Line 49, delete "pm$_i$," and insert -- pm$_i$. --, therefor.

Signed and Sealed this
Fourteenth Day of May, 2013

Teresa Stanek Rea
*Acting Director of the United States Patent and Trademark Office*